(12) United States Patent
Roberts et al.

(10) Patent No.: US 7,382,985 B2
(45) Date of Patent: Jun. 3, 2008

(54) ELECTRICAL DOMAIN MITIGATION OF POLARIZATION DEPENDENT EFFECTS IN AN OPTICAL COMMUNICATIONS SYSTEM

(75) Inventors: Kim B. Roberts, Nepean (CA); Leo Strawczynski, Ottawa (CA); Adrien Comeau, Nepean (CA); John McNicol, Ottawa (CA); Maurice O'Sullivan, Ottawa (CA); Kieran Parsons, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 912 days.

(21) Appl. No.: 10/307,466

(22) Filed: Dec. 2, 2002

(65) Prior Publication Data

US 2004/0105682 A1 Jun. 3, 2004

(51) Int. Cl.
*H04B 10/00* (2006.01)
*H04B 10/12* (2006.01)
*H04B 10/04* (2006.01)

(52) U.S. Cl. ............... 398/159; 398/147; 398/193
(58) Field of Classification Search ............... 398/147, 398/159, 193
See application file for complete search history.

(56) References Cited

U.S. PATENT DOCUMENTS

| | | | |
|---|---|---|---|
| 5,148,503 A | 9/1992 | Skeie | 385/3 |
| 5,311,346 A | 5/1994 | Haas et al. | 359/156 |
| 5,349,312 A | 9/1994 | Huettner et al. | |
| 5,408,498 A | 4/1995 | Yoshida | 375/286 |
| 5,416,626 A | 5/1995 | Taylor | 359/156 |
| 5,513,029 A | 4/1996 | Roberts | 359/177 |
| 5,579,328 A | 11/1996 | Habel et al. | 372/31 |
| 5,761,225 A | 6/1998 | Fidric et al. | 372/6 |
| 5,892,858 A | 4/1999 | Vaziri et al. | 385/2 |
| 5,949,560 A | 9/1999 | Roberts et al. | 359/110 |
| 5,999,258 A | 12/1999 | Roberts | 356/345 |
| 6,067,180 A | 5/2000 | Roberts | 359/181 |

(Continued)

FOREIGN PATENT DOCUMENTS

DE 19852597 A1 * 5/2000

(Continued)

OTHER PUBLICATIONS

Adaptive Electronic Linearization of Fiber Optic Links, OFC 2003, vol. 2, pp. 477-480, Mar. 2003, Sadhwani et al.

(Continued)

*Primary Examiner*—Jason Chan
*Assistant Examiner*—Nathan Curs
(74) *Attorney, Agent, or Firm*—Kent Daniels; Ogilvy Renault LLP (57) ABSTRACT

Polarization Dependent Effects (PDEs), including Polarization Mode Dispersion (PMD) and Polarization Dependent Loss (PDL) imposed on optical signals conveyed through an optical link are compensated by processing an input signal in the electrical domain prior to transmission. A compensation function is derived that at least partially compensates the PDEs. The communications signal is then processed in the electrical domain using the compensation function to generate an electrical predistorted signal. The electrical predistorted signal is then used to modulate an optical source to generate a corresponding predistorted optical signal for transmission through the optical link. The PDEs of the optical link operate of the predistorted optical signal such at that substantially undistorted optical signal is received at a receiving end of the link.

33 Claims, 5 Drawing Sheets

U.S. PATENT DOCUMENTS

| | | | |
|---|---|---|---|
| 6,115,162 | A | 9/2000 | Graves et al. ............... 359/173 |
| 6,124,960 | A | 9/2000 | Garthe et al. ................ 359/181 |
| 6,128,111 | A | 10/2000 | Roberts ....................... 359/110 |
| 6,205,262 | B1 | 3/2001 | Shen ............................ 385/11 |
| 6,236,488 | B1* | 5/2001 | Shimizu et al. ............. 398/198 |
| 6,262,834 | B1 | 7/2001 | Nichols et al. ............. 359/301 |
| 6,301,550 | B1* | 10/2001 | Okamoto et al. ........... 702/167 |
| 6,304,369 | B1 | 10/2001 | Piehler .................... 359/337.4 |
| 6,441,932 | B1 | 8/2002 | Helkey ........................ 359/110 |
| 6,473,013 | B1 | 10/2002 | Velazquez et al. .......... 341/120 |
| 6,559,994 | B1 | 5/2003 | Chen et al. .................. 359/180 |
| 6,580,532 | B1 | 6/2003 | Yao et al. .................... 359/111 |
| 2001/0028760 | A1 | 10/2001 | Yaffe |
| 2002/0018268 | A1 | 2/2002 | Price et al. |
| 2002/0024694 | A1* | 2/2002 | Newell et al. ............... 359/124 |
| 2002/0106148 | A1 | 8/2002 | Schemmann et al. |
| 2003/0011847 | A1 | 1/2003 | Dai Fa et al. |
| 2004/0197103 | A1* | 10/2004 | Roberts et al. ............. 398/159 |

FOREIGN PATENT DOCUMENTS

| | | |
|---|---|---|
| EP | 0 524 758 | 1/1993 |
| EP | 1 237 307 | 9/2002 |
| WO | WO 01/03339 | 1/2001 |
| WO | WO 01/91342 | 11/2001 |
| WO | WO 02/043340 | 5/2002 |

OTHER PUBLICATIONS

Chromatic Dispersion Mapping by Sensing the Power Distribution of Four-Wave Mixing Along the Fiber Using Brillouin Probing, OFC 2003, vol. 2, pp. 714-716, Herraez et al.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

Exact Compensation for both Chromatic Dispersion and Kerr Effect in a Transmission Fiber Using Optical Phase Conjunction, Journal of Lightwave Technology, vol. 14, No. 3, Mar. 1996, Watanabe et al.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Scott et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Predistortion of Electroabsorption Modulators for Analog CATV Systems at 1.55*m, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Reduction of Dispersion-Induced Distortion in SCM Transmission Systems by Using Predistortion-Linearized MQW-EA Modulatirs, Journal of Lightwave Technology, vol. 15, No. 2, Feb. 1997, T. Iwai et al.

Signal Distortion and Noise in AM-SCM Transmission Systems Employing the Feedfrorward Linearized MQW-EA External Modulator, Journal of Lightwave Technology, vol. 15, No. 8, Aug. 1995, T. Iwai et al.

Soliton Transmission Using Periodic Dispersion Compensation, Journal of Lightwave Technology, vol. 15, No. 10, Oct. 1997, Nicholas J. Smith et al.

A. Mecozzi et al. "Cancellation of timing and Amplitude Jitter in Symmetric Links Using Highly Dispersed Pulses", IEEE Photonics Technology Letters, vol. 13, No. 5, May 2001, pp. 445-447, USA.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

Polarization Modulated Direct Detection Optical Transmission Systems, Journal of Lightwave Technology, vol. 10, No. 12, pp. 1985-1997, Dec. 1992, Betti et al.

Theoretical Basis of Polarization Mode Dispersion Equalization up to the Second Order, Journal of Lightwave Technology, vol. 18, No. 4, pp. 614-617, Apr. 2000, Kudou et al.

Automated Measurement of Polarization Mode Dispersion Using Jones Matrix Eigenanalysis, IEE Photonics Technology Letters, vol. 4, No. 9, pp. 1066-1069, Sep. 1992, Heffner.

Measurement of High-Order Polarization Mode Dispersion, IEE Photonics Technology Letters, vol. 12, No. 7, pp. 861-863, Jul. 2000, Li et al.

Design of Broad-Band PMD Compensation Filters, IEE Photonics Technology Letters, vol. 14, No. 8, pp. 1088-1090, Aug. 2002, Eyal et al.

Representation of second order polarization mode dispersion, Electronics Letters, vol. 35, No. 19, pp. 1658-1659, Sep. 16, 1999, Marshall et al.

Polarization Effects in Lightwave Systems, Craig D. Poole and Jonathan Nagel, 1997.

Dispersion Compensation by Active Predistorted Signal Synthesis, Journal of Lightwave Technology, vol. LT-3, No. 4, Aug. 1985, Thomas L. Koch and Rod C. Alferness.

Sadhwani, Ram et al "Adaptive CMOS Predistortion Linearizer for Fiber-Optic Links", Journal of Lightwave Technology, Dec. 2003, pp. 3180-3193, vol. 21, No. 12., U.S.A.

Andre, P.S. et al "Extraction of DFB Laser Rate Equations Parameters for Optical Simulation Purposes", Conftele 99 ISBN 972-98115-0-4, pp. 561-564, 1999.

Illing, Lucas et al "Shaping current waveforms for direct modulation of semiconductor lasers", Institute for Nonlinear Science, 2003, San Diego, U.S.A.

Watts, P.M. et al "Demonstration of Electrical Dispersion Compensation of Single Sideband Optical Transmission", Optical Networks Group, Dept. of Electronic and Electrical Engineering, University College London, Torrington Place, London. 2003.

Kim, Hoon et al "10 Gbit/s 177 km transmission over conventional singlemode fibre using a vestigial side-band modulation format", Electronics Letters, Dec. 6, 2001, pp. 1533-1534, vol. 37, No. 25.

Bulow, Henning et al "Dispersion Mitigation Using a Fiber-Bragg-Grating Sideband Filter and a Tunable Electronic Equalizer", WDD34, pp. 1-4, 2001.

Sieben, M. et al "10Gbit/s optical single sideband system", Electronics Letters, May 22, 1997, pp. 971-9733, vol. 33, No. 11.

Schaffer, Troy A. et al "A 2GHz 12-bit Digital-to-Analog Converter for Direct Digital Synthesis Applications", GaAs IC Symposium, pp. 61-64, 1996.

Kamotoa, T. et al "An 8-bit 2-ns Monolithic DAC", IEEE Journal of Solid-State Circuits, Feb. 1988, vol. 23, No. 1.

* cited by examiner

ELECTRICAL DOMAIN MITIGATION OF POLARIZATION DEPENDENT EFFECTS IN AN OPTICAL COMMUNICATIONS SYSTEM

CROSS-REFERENCE TO RELATED APPLICATIONS

This is the first application filed for the present invention.

MICROFICHE APPENDIX

Not Applicable.

TECHNICAL FIELD

The present invention relates to optical communications systems, and in particular to electrical domain compensation of polarization dependent effects in an optical communications system.

BACKGROUND OF THE INVENTION

The presence of polarization dependent effects (such as, for example, Polarization Dependent Loss/gain (PDL); Polarization Mode dispersion (PMD); Polarization spectral hole burning; Polarization rotation; nonlinearities that are polarization dependent or that otherwise have a polarization effect; polarization dependent filtering or crosstalk; and Faraday effect) can be a limiting factor in the design of optical transmission systems, particularly those providing long haul transmission at bit-rates of 10 Gb/sec or faster, over optical links (e.g. fibers) of 100 kilometers or more in length. The impact of polarization dependent effects (PDEs) in high bandwidth networks is expected to be particularly severe in systems which incorporate cross connected networks of fibers, in which an optical signal can follow any one of a number of possible routes utilizing different fibers (within the same or different cable), each with individual properties. This is particularly so for communications systems utilizing polarization diversity and polarization multiplexing.

The amount of PDE (PDL and/or PMD) varies from fiber to fiber, being dependent upon the amount of intrinsic birefringence associated with core asymmetry or frozen-in stress; extrinsic birefringence associated, for example, with cable induced stress, fiber bends or twists; and polarization coupling between optical elements within a link. As a result of these factors, PDEs tend to be statistical quantities which vary with both wavelength and time.

Optical communications systems suffer degradation attributable to Polarization Dependent Loss (PDL) generally through transients and noise. Transient changes in the polarization couplings along a fiber route cause a transient change in the received power of a polarized signal, which cause errors in the receiver. Furthermore, Amplified Spontaneous Emission (ASE) noise is generally unpolarized, and so PDL along an optical fiber route will tend to attenuate the polarized signal more than the ASE noise travelling with that signal. This will further impair the optical signal-to-noise ratio.

It is known to use polarization scrambling to mitigate the effects of PDL, as disclosed in U.S. Pat. No. 5,416,626, entitled "Optically Amplified Communications Systems", which issued on May 16, 1995. It is further known to attempt to minimize the PDL introduced by an optical device by improving the design of that device, or controlling the temperature of that device to a fixed value. However, in order to mitigate the effects of PDL inherent in an optical link, it is necessary to compensate PDL dynamically. For WDM communications systems, this functionality must be implemented across a wavelength range that encompasses the optical signal traffic.

Various systems have been proposed for addressing the requirement for broadband dynamic PDL compensation. A typical example is described in "Demonstration of In-Line Monitoring and Dynamic Broadband Compensation of Polarization Dependent Loss" (L. -S. Yan, Q. Yu, and A. E. Willner, paper We.P.38, ECOC'2001). In this system, broadband PDL compensation is achieved by demultiplexing the WDM optical signal to separate each wavelength channel into a respective parallel optical path. The PDL of each of the separated channels is then independently measured and compensated, in parallel, and the thus "PDL-compensated" channels multiplexed back together.

A limitation of this approach is that WDM systems that achieve high spectral efficiencies (e.g., better than about 0.3 bits per second per Hz) generally suffer significant distortion penalties for each multiplexing and demultiplexing function. In addition, per-channel PDL compensation inherently introduces "deadbands" between channels. Within these deadbands, signals cannot be transmitted and PDL cannot be compensated. This tightly ties the PDL compensation system to the particular wavelength plan of the communications system, which is undesirable.

A known method of broadband PDL compensation that avoids deadbands is to impose a selected PDL across a wavelength band of interest (e.g. 5-6 nm wide). However, PDL can exhibit a strong wavelength dependence. Accordingly, the imposed PDL will normally be selected to compensate an average PDL within the wavelength band. While this approach avoids undesirable deadbands, it can only compensate a portion of the PDL within the wavelength band, leaving at least some PDL un-compensated.

Another method of reducing the accumulation of PDL in a optical fiber link is depolarization of the optical signal traffic. Such methods are taught in U.S. Pat. No. 6,205,262, for example. However, depolarization does not permit any dynamic equalization of PDL across a spectrum of channels.

Although the optical fibers used for long-haul optical transmission are nominally "single mode", propagation is generally characterized by two orthogonally polarized $HE_{11}$ modes for which slightly different group velocities exist in the presence of birefringence. Accordingly, for an arbitrary polarization state of an optical signal at the input end of the fibre, the optical signal at the output end of the fibre will consist of both polarization modes separated by a certain amount of group delay, or Polarization Mode Dispersion (PMD), which is usually measured in pico seconds per $\sqrt{}$km. Cross-coupling of energy between the polarization modes, in the presence of this differential group delay (DGD), causes waveform distortion and consequent degradation of optical signal quality. Second order PMD produces further signal distortions in the form of differential chromatic dispersion (that is, "polarization-dependent" chromatic dispersion) between the orthogonal polarization modes.

For a detailed description of PMD, see "Long-Term Measurement of PMD and Polarization Drift in Installed Fibers", Magnus Karlsson et al., Journal of Lightwave Technology, Vol. 18, No. 7, (July, 2000). The effects of PMD in a high bandwidth optical link is discussed in "Temporal Dynamics of Error-Rate Degradation Induced by Polarization Mode Dispersion Fluctuation of a Field Fiber Link", Henning Bulow et al., Proceedings of the $23^{rd}$ European Conference on Optical Communications, IOOC-ECOC '97, Edinburgh, UK, Sep. 22-25, 1997. Various methods are known for measuring PMD in an optical transmission system, such as, for example, as disclosed in U.S. Pat. No. 5,949,560 (Roberts et al.); "Automated Measurement of Polarization Mode Dispersion Using Jones Matrix Eigenanalysis", Heffner, IEEE Photonics Technology Letters, Vol. 4, No. 9, September 1992, pp.1066-1069; and "Measurement of High-Order Polarization Mode Dispersion", Li et al., IEEE Photonics Technology Letters, Vol. 12, No. 7, July 2000, pp.861-863.

Optical transmission systems using data transmission rates of up to about 10 Gb/s are normally able to tolerate polarization mode dispersion (PMD) on the order of 0.2 pico seconds per √km. Future optical transmission systems are expected to achieve data transmission rates of 40 Gb/s (or more), and thus are more likely to be limited by the effects of polarization mode dispersion.

In the prior art, there are three general categories of techniques used for PMD compensation, namely: all-optical, all electrical and hybrid. Of these, all-optical PMD compensation, in which the optical signals remain in the optical domain, is the dominant technique used for PMD compensation in high-speed optical communications.

All-optical PMD compensation methods typically involve the use of a controllable birefringence to impose a differential phase delay to each of the orthogonal $HE_{11}$ modes. The imposed phase delay is selected to optimize system performance by offsetting at least some of the PMD impressed on the optical signal up-stream of the compensator. These compensation methods typically suffer disadvantages in that the phase delay of controllable birefringent materials typically varies approximately linearly with polarization angle and wavelength. However, PMD is typically non-linear across the range of wavelengths used in WDM optical transmission systems. It is therefore difficult to obtain the desired differential phase delay across the wavelength band of interest. All-optical PMD compensator devices intended to address this problem tend to be highly complex, expensive to manufacture, and suffer from high optical losses.

First order PMD can also be avoided by launching an optical signal on one principle axis of the optical link. This technique is described in U.S. Pat. No. 5,311,346, entitled "Fiber-optic Transmission Polarization-Dependent Distortion Compensation", which issued on May 10, 1994. In this patent, an optical polarization rotator placed at the transmitter end of an optical link is used to rotate the polarization state of the optical signal to minimize signal distortion measured at the receiver end of the link. This technique is capable of avoiding first order PMD, provided that the PDL is small. However, it cannot mitigate the effects of second or higher order PMD, nor can it contend with the combined effects of both PMD and PDL, when both of these are present in significant amounts.

All-electrical PMD-compensation systems are normally limited to linear electrical filtering in a coherent receiver. Typical examples of such systems are described in "Electronic Equalization Of Fiber PMD-Induced Distortion At 10 Gbit/S" by H. Bulow et al, Optical Fiber Communication (OFC'98), pages 151-152, (1998), and "Equalization in Coherent Lightwave Systems Using a Fractionally Spaced Equalizer" by J. Winters, Lightwave Tech., Vol. 8, No. 01, Oct. 1990, pp 1487-1491. These systems suffer the disadvantage that they are limited to coherent receivers. However, because of their high cost, very few coherent receivers have been installed, and the cost of replacing installed receivers with the high-performance coherent receivers is prohibitive.

The majority of receivers installed in modern optical communications networks are of the direct detection type. Due to the well known squaring effect in these receivers, electrical processing of the output signal is capable of compensating only a very limited amount of PMD. See, for example, "Performance of Smart Lightwave Receivers with Linear Equalization" Cartledge et al, Journal of Lightwave Tech, Vol. 10, No. 8, August 1992, pp. 1105-1109; and "Electrical Signal Processing Techniques in Long-Haul Fiber-Optic Systems" Winters et al, IEEE Trans. Comms, Vol. 38, No. 9, September 1990, pp. 1439-1453}.

Hybrid PMD compensation is a technique that uses both optical and electrical methods to restore the distortion due to PMD. In the article entitled "Polarization Mode Dispersion Compensation by Phase Diversity Detection" by B. W. Hakki, IEEE Photonics Technology Letters, Vol. 9, No. 1, pages 121-123, January 1997, a hybrid PMD compensation technique is disclosed wherein a polarization controller (PC) and a polarization beam splitter (PBS) are used to transform the states of polarization, and split the polarization components. At each output of the PBS, a high-speed photodetector converts the optical signal to electrical signal. An electrical delay line is used to adjust the phase delay between the two electrical signals.

A cost-effective technique for mitigating effects of polarization on high bandwidth optical signals remains highly desirable.

SUMMARY OF THE INVENTION

Accordingly, an object of the present invention is to provide a cost-effective technique for mitigating effects of polarization on high bandwidth optical signals in an optical communications system.

An aspect of the present invention provides a method of mitigating polarization dependent effects (PDEs) of an optical link of an optical communications system. According to the invention, a compensation function is derived that at least partially compensates the PDEs of the optical link. An input signal is then processed, in the electrical domain, using the compensation function to generate a predistorted signal. With this arrangement, modulation of an optical source using the predistorted signal generates a corresponding predistorted optical signal for transmission through the optical link. As the predistorted optical signal traverses the link, the PDEs of the link operate on the optical signal so that a substantially undistorted optical signal is obtained at a receiving end of the link.

Thus a further aspect of the present invention provides a method of conveying a bit stream through an optical link between a transmitter and a receiver. According to the invention, a compensation function is derived that at least partially compensates the PDEs of the optical link. A bit stream is then processed in the electrical domain using the compensation function to generate a predistorted signal. An optical source is modulated using the predistorted signal to generate a corresponding predistorted optical signal that is launched through the optical link. As the predistorted optical signal traverses the optical link, the PDEs of the optical link operate on the optical signal so that a substantially undistorted optical signal is received at a receiving end of the optical link.

Thus the method of the invention implements PDE compensation at the transmitter end of the optical link, prior to Electrical-to-Optical (E/O) conversion of the input signal. This arrangement is particularly advantageous, because it enables PDE compensation to be effectively implemented independently of the type of detection (i.e., direct or coherent) used in the receiver.

Thus the present invention compensates PDEs by processing a communications signal in the electrical domain prior to transmission through an optical link of a communications system. This processing of the communications signal is governed in accordance with a compensation function that is the inverse of the optical link transfer function. With this arrangement, arbitrary PDEs imparted by the optical link can be compensated in such a manner that a comparatively undistorted optical signal is obtained at the receiving end of the optical link.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
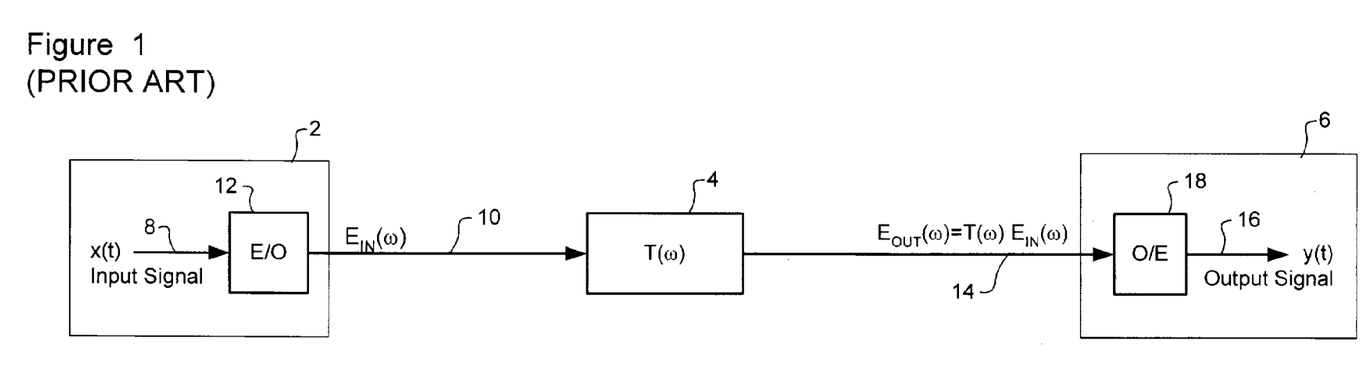
FIG. 1 is a block diagram schematically illustrating transmission of an input signal through a conventional optical communications system.
Figure 2:
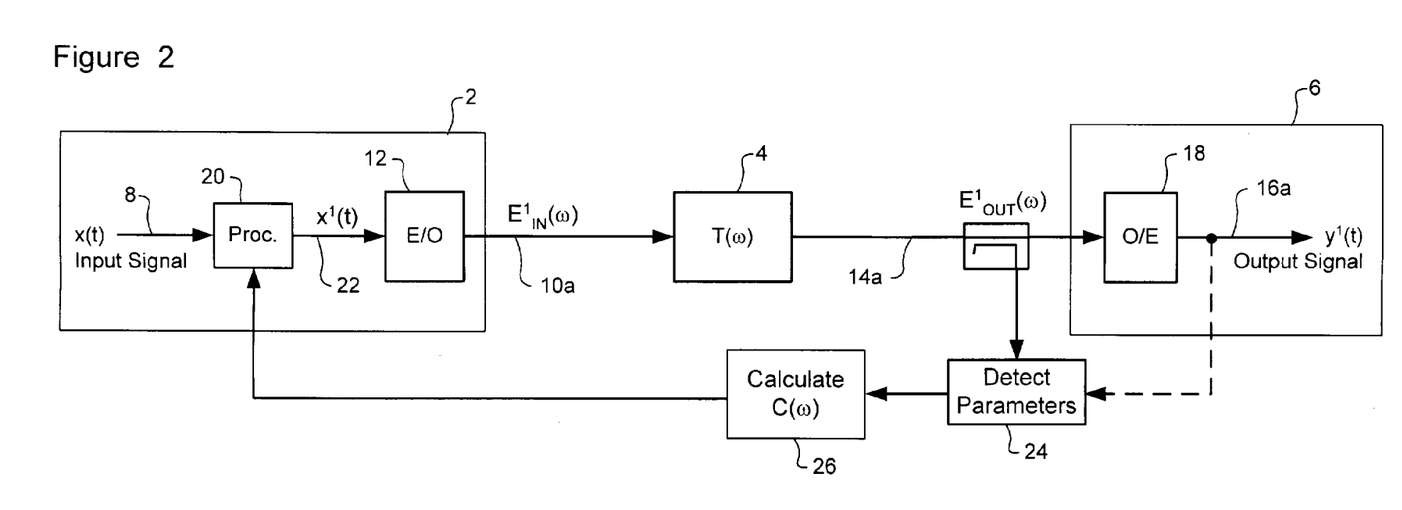
FIG. 2 is a block diagram schematically illustrating transmission of an input signal through an optical communications system in accordance an embodiment of the present invention.

The present invention provides a method and system for mitigating polarization dependent effects (PDEs), including both polarization mode dispersion (PMD) and polarization dependent loss (PDL), in an optical communications system. FIG. 1 is a block diagram schematically illustrating principal elements of a conventional optical communications system in which the present invention may be deployed. FIG. 2 is a block diagram schematically illustrating principal operations in accordance with the method of the present invention.

As shown in FIG. 1, an optical communications system is represented by a transmitter 2 and a receiver 6 separated by an optical link 4. As is well known in the art, the link 4 may include multiple optical fiber spans separated by active optical devices such as, for example, optical amplifiers, channel equalizers etc. For simplicity of illustration, these elements are not shown in the drawings. Signal distortions due to Polarization Mode Dispersion (PMD) and Polarization Dependent Loss (PDL) impressed on optical signals traversing the link 4 are represented by a system transfer function $T(\omega)$. A detailed derivation of the transfer function $T(\omega)$, for the case of PMD is provided by Kudou et al. in "Theoretical Basis of Polarization Mode Dispersion Equalization Up To the Second Order", Journal of Lightwave Technology, Vol. 18, No. 4, April 2000, and Huttner et al. in "Polarization Induced Distortions in Optical Fiber Networks with Polarization Mode Dispersion and Polarization Dependent Losses", IEEE Journal of Selected Topics in Quantum Electronics, Vol. 6, No. 2, March/April 2000. Thus the operator representation of PMD can be derived from the Taylor expansion around the optical carrier frequency $\omega_c$. For modeling first and second order PMD, this Taylor expansion takes the form:

$$T(\omega) = \exp\left(\frac{1}{2}\frac{dD}{d\omega}\delta\omega^2 + D\delta\omega\right) \cdot T(\omega_c) \qquad \text{(Eq. 1)}$$

This transfer function $T(\omega)$ is normally formulated using Jones matrix notation of the form:

$$T(\omega) = e^{\alpha(\omega)}\begin{bmatrix} u_1(\omega) & u_2(\omega) \\ -u_2^*(\omega) & u_1^*(\omega) \end{bmatrix} \qquad \text{(Eq. 2)}$$

A directly analogous derivation of the transfer function $T(\omega)$, incorporating the effects of Polarization Dependent Loss (PDL), can be performed, and yields a Taylor expansion and Jones matrix of substantially the same form as shown in Equations 1 and 2 above. Such derivation is considered to be well within the perview of those of ordinary skill in the art, and will not be described in further detail.

In operation, a communication signal (or bit-stream) in the form of an electrical input signal $x(t)$ 8 is converted into a corresponding optical signal $E_{IN}(\omega)$ 10 by a conventional Electrical-to-Optical (E/O) converter 12. As the optical signal $E_{IN}(\omega)$ 10 traverses the optical link 4, it is distorted by the transfer function $T(\omega)$, and arrives at the receiver 6 as a received optical signal $E_{OUT}(\omega)[=T(\omega)E_{IN}(\omega)]$ 14. Within the receiver 6, the received optical signal $E_{OUT}(\omega)$ 14 is converted into a corresponding electrical output signal $y(t)$ 16 by a conventional Optical-to-Electrical (O/E) converter 18.

In accordance with the present invention, signal distortions due to $T(\omega)$ are at least partially compensated by deriving a compensation function $C(\omega)$ that optimizes the optical performance of the link 4. As shown in FIG. 2, a compensation processor 20 uses the compensation function $C(\omega)$ to process the input signal $x(t)$ 8 in the electrical domain, thereby producing a predistorted electrical input signal $x^1(t)$ 22. The predistorted input signal $x^1(t)$ 22 is then converted into a corresponding predistorted optical signal $E^1_{IN}(\omega)$ 10a by the E/O converter 12 and transmitted through the optical link 4 to the receiver 6. Mathematically, the predistorted optical signal $E^1_{IN}(\omega)$ 10a can be related to the (undistorted) optical signal $E_{IN}(\omega)$ 10 generated by the E/O converter 12 in the conventional system of FIG. 1 as $E_{IN}^1(\omega)=C(\omega)E_{IN}(\omega)$.

Within the receiver 6, the incoming optical signal $E^1_{OUT}(\omega)$ 14a is converted by the Optical-to-electrical (O/E) converter 18 into a corresponding output signal $y^1(t)$ 16a. As may be seen in FIG. 2, the received optical signal $E^1_{OUT}(\omega)$ 14a is the predistorted optical signal $E^1_{IN}(\omega)$ 10a multiplied by the transfer function $T(\omega)$, thus:

$$E_{OUT}^1(\omega)=T(\omega)E_{IN}^1(\omega)=T(\omega)C(\omega)E_{IN}(\omega) \qquad \text{(Eq.3)}$$

As may be appreciated, when the distortions introduced by the compensation function C(ω) exactly counterbalance those introduced by the system transfer function T(ω), the received optical signal $E_{OUT}^1(\omega)$ 14a "seen" by the O/E converter 18 will be substantially identical to the original (undistorted) optical signal $E_{IN}(\omega)$ 10 (FIG. 1). Thus the present invention provides a technique for compensating distortions impressed upon optical signals traversing the link 4, by predistorting the input signal x(t) 8, in the electrical domain, prior to E/O conversion and transmission through the optical link 4. Because distortion compensation is accomplished in the electrical domain, a substantially arbitrary compensation function C(ω) can be implemented, thereby facilitating effective compensation of even comparatively severe PDES.

It may be noted that extreme PDEs can be imagined (such as, for example 30 dB of PDL) for which a practical solution for the compensation function C(ω) will not be possible. Furthermore, it should be appreciated that the extent or degree of PDE compensation will be inherently limited by the formulation of the compensation function C(ω) implemented in the polarization processor 20. For example, consider a case in which the compensation function C(ω) is formulated to only compensate first order PMD. While parameters of this compensation function C(ω) can be derived such that first order PMD is exactly compensated, signal distortions due to other PDEs of the link (such as PDL and second order PMD) will remain uncompensated. Accordingly, for the purposes of the present disclosure, references to "PDE compensation", "compensation of PDES" and the like should be understood to refer to those PDEs that are compensated by the specific compensation function C(ω) being used in that embodiment. Similarly, references to a "substantially undistorted optical signal" being obtained at a receiving end of the link 4, as a result of PDEs of the link 4 operating on the predistorted optical signal $E_{IN}^1(\omega)$ 10a, should be understood to mean that the received optical signal $E_{OUT}^1(\omega)$ 14a is substantially free of signal distortions due to those PDEs that are compensated by the specific compensation function C(ω) being used in that embodiment.

Various methods may be used to derive the compensation function C(ω). In the example of FIG. 2, the optical signal $E_{OUT}^1(\omega)$ 14a at or near the receiver end of the optical link 4 is monitored (at 24) in order to detect signal quality parameters indicative of PDEs of the optical link 4. In preferred embodiments, the signal quality parameters comprise a direct measurement of PMD and/or PDL as a function of wavelength across the wavelength band of interest. Methods of measuring PMD and PDL are known in the art. See, for example, U.S. Pat. No. 5,949,560 (Roberts et al.); "Automated Measurement of Polarization Mode Dispersion Using Jones Matrix Eigenanalysis", Heffner, IEEE Photonics Technology Letters, Vol. 4, No. 9, September 1992, pp.1066-1069; and "Measurement of High-Order Polarization Mode Dispersion", Li et al., IEEE Photonics Technology Letters, Vol. 12, No. 7, July 2000, pp.861-863. However, other signal quality parameters such as, for example, the bit error rate, signal-to-noise S/N ratio, variance of the signal dispersion or eye closure may be used as proxies for the PDEs. Any of the signal quality parameters may be detected based on an optical signal obtained by tapping the optical link 4 (as shown by solid lines in FIG. 2), or alternatively by analysis of the output signal $y^1(t)$ 16a generated by the E/O converter 18 (as shown by the dashed line in FIG. 2). A compensation function C(ω) which optimizes the detected parameters can then be derived (at 26) deterministically and/or adaptively, using known techniques. For example, for compensating both first and second order PMD, the compensation function C(ω) can be expressed as:

$$C(\omega) = T^{-1}(\omega_c) X \begin{bmatrix} \exp(j\Gamma_1 \delta\omega) & 0 \\ 0 & \exp(j\Gamma_2 \delta\omega) \end{bmatrix} \quad \text{(Eq. 4)}$$
$$X^{-1} Y \begin{bmatrix} \exp(j\beta_1 \delta\omega^2) & 0 \\ 0 & \exp(j\beta_2 \delta\omega^2) \end{bmatrix} Y^{-1}$$

With this formulation, the matrices $T^{-1}(\omega_c)X$, $X^{-1}Y$ and $Y^{-1}$ can be implemented within the compensation processor 18 by means of known complex multiplier circuits, and the matrix terms $$\begin{bmatrix} \exp(j\Gamma_1 \delta\omega) & 0 \\ 0 & \exp(j\Gamma_2 \delta\omega) \end{bmatrix} \text{ and } \begin{bmatrix} \exp(j\beta_1 \delta\omega^2) & 0 \\ 0 & \exp(j\beta_2 \delta\omega^2) \end{bmatrix}$$

implemented by known digital filter blocks such as Finite Impulse Response (FIR), Infinite Impulse Response (IIR) and Fast Fourier Transform (FFT) filters. Derivation of the compensation function C(ω) (at 26) can then be accomplished by finding appropriate values for $T^{-1}(\omega_c)X$, $X^{-1}Y$, $Y^{-1}$, $\beta_1$, $\beta_2$, $\Gamma_1$, and $\Gamma_2$. In embodiments in which the detected parameters comprise direct measurement of PMD, values for $T^{-1}(\omega_c)X$, $X^{-1}Y$, $Y^{-1}$, $\beta_1$, $\beta_2$, $\Gamma_1$ and $\Gamma_2$ can be found to minimize (and preferably eliminate) the total PMD. Where bit error rate and/or eye closure are used as proxies, then values can be calculated to optimize the proxy value.

It will be appreciated that a compensation function C(ω) of the same general form as shown above in Eq.4 may be used to compensate both PMD and PDL. The mathematical manipulations required to incorporate PDL compensation into Eq.4 are considered to be well within the perview of those or ordinary skill in the art, and therefore will not be described in further detail.

As may be appreciated, in order to facilitate PDE compensation, the E/O converter 12 must be designed in such a manner that differential polarization rotations and delays can be impressed onto an optical signal, in addition to amplitude information of the input signal x(t) 8. Various known E/O converters are capable of providing this functionality. In the illustrated embodiments (see FIGS. 3-5), the E/O converter 12 is provided as a tuned optical source 28 such as a narrow band laser coupled to a pair of conventional 2-dimentional optical modulators 30. A conventional optical power divider 32 operates to divide the light from the source 28 into a pair of $HE_{11}$ modes, each of which is modulated by a respective one of the 2-D modulators 30. One of the $HE_{11}$ modes is subjected to a polarization rotation of 90°, for example using a conventional quarter-wave birefringent plate 34. The modulated $HE_{11}$ modes are then combined by a conventional polarization combiner 36 and launched into the optical link 4. With this arrangement, each 2-D modulator 30 can be independently driven to modulate the amplitude and phase delay of its respective optical mode. Various known 2-D optical modulators capable of providing this functionality are known in the art, such as, for example, Mach-Zehnder modulators.

Figure 3A:
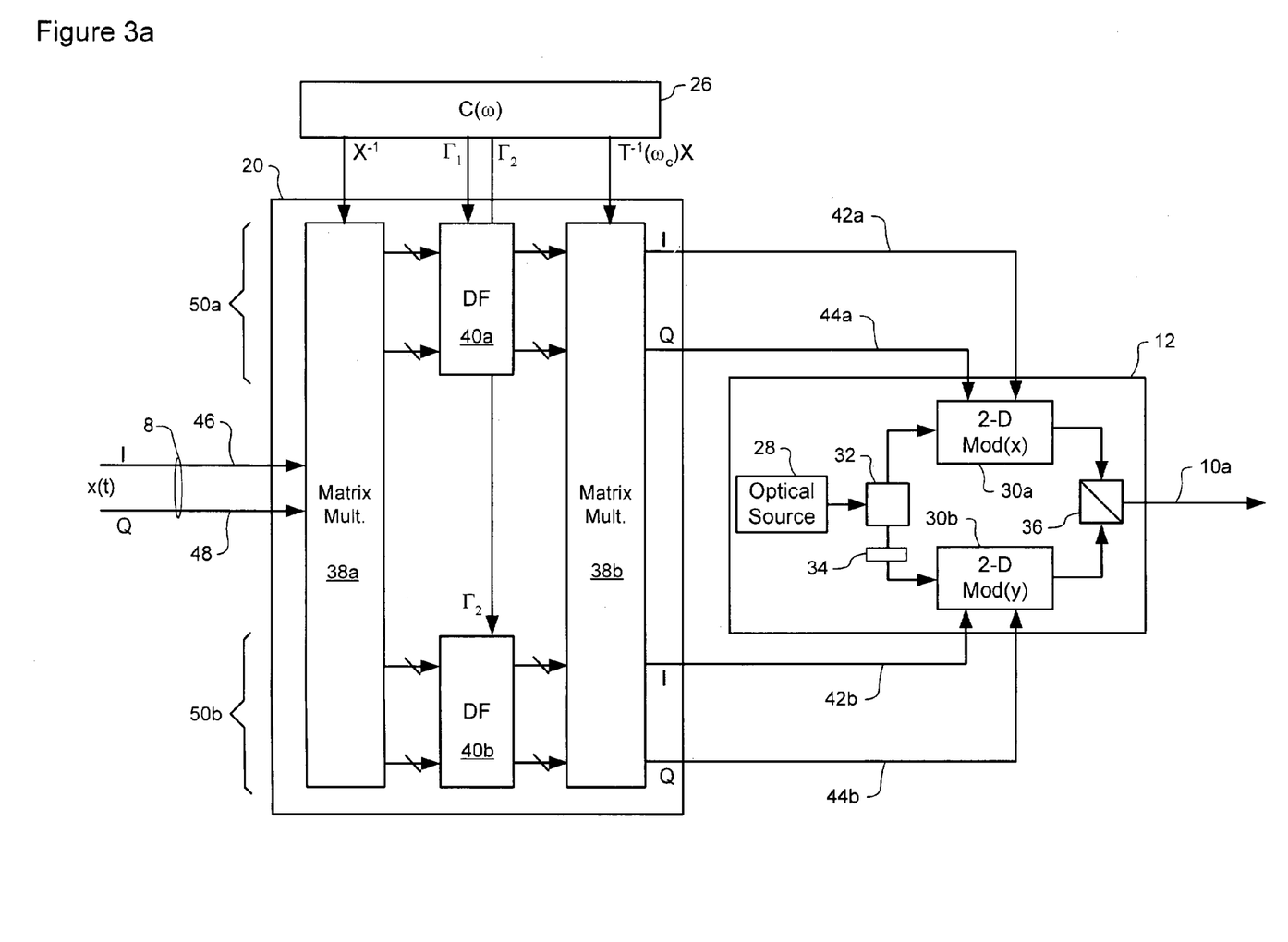
FIGS. 3a and 3b are block diagrams schematically illustrating principal elements and operations of respective PDE compensation systems for compensating first order PDE, in accordance with the present invention.
Figure 3B:
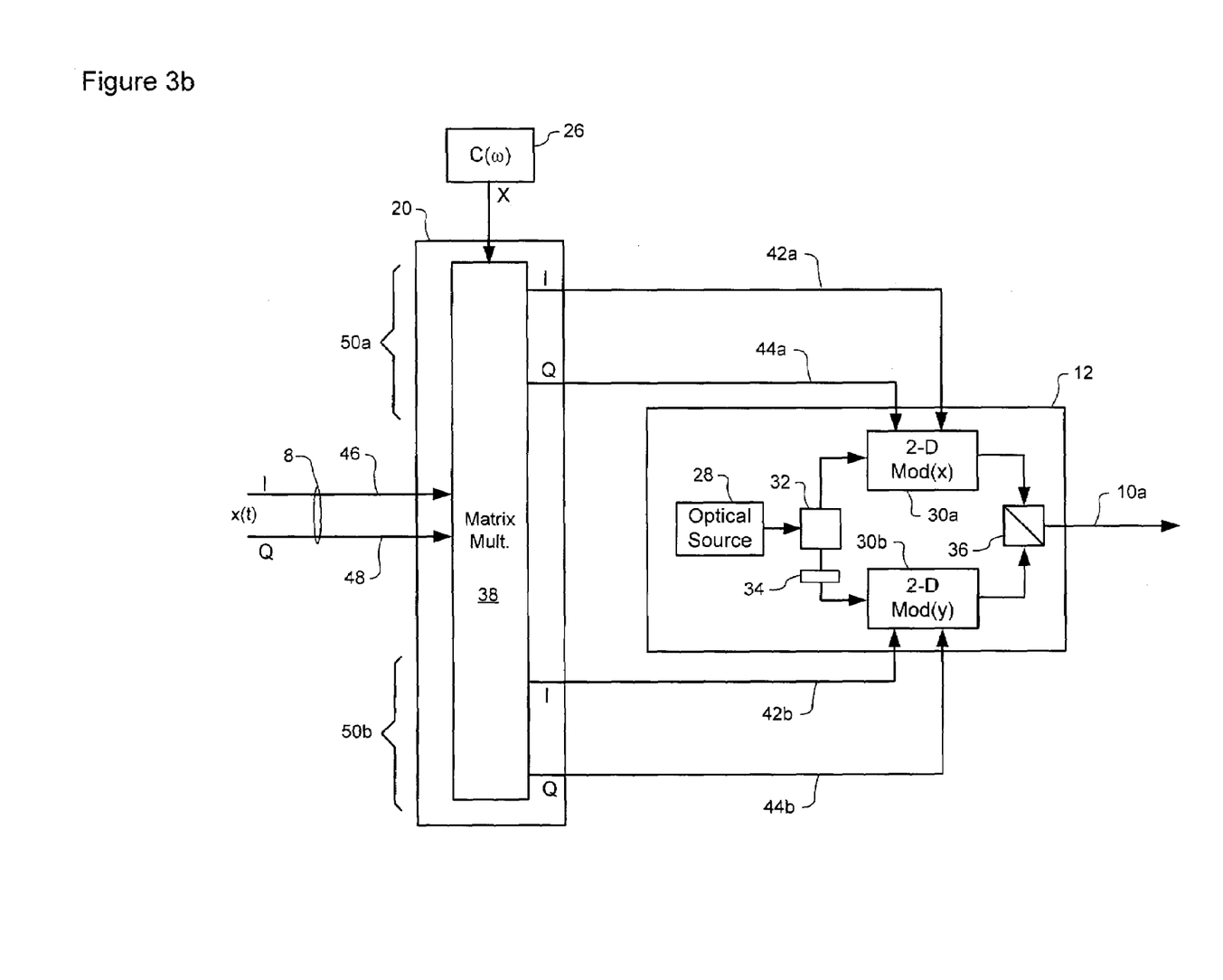
Figure 4:
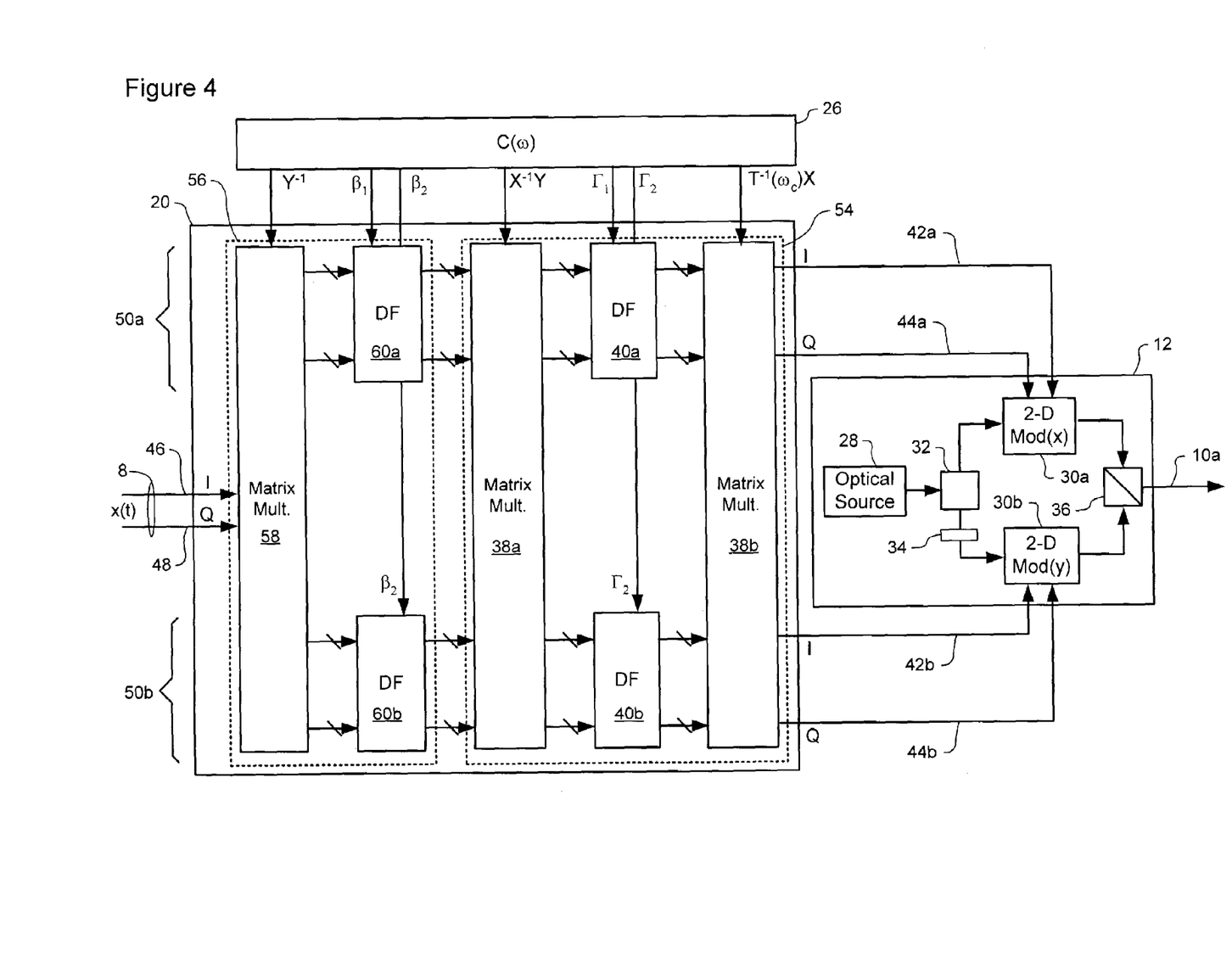
FIG. 4 is a block diagram schematically illustrating principal elements and operations of a PDE compensation system for compensating both first and second order PDE, in accordance with the present invention.
Figure 5:
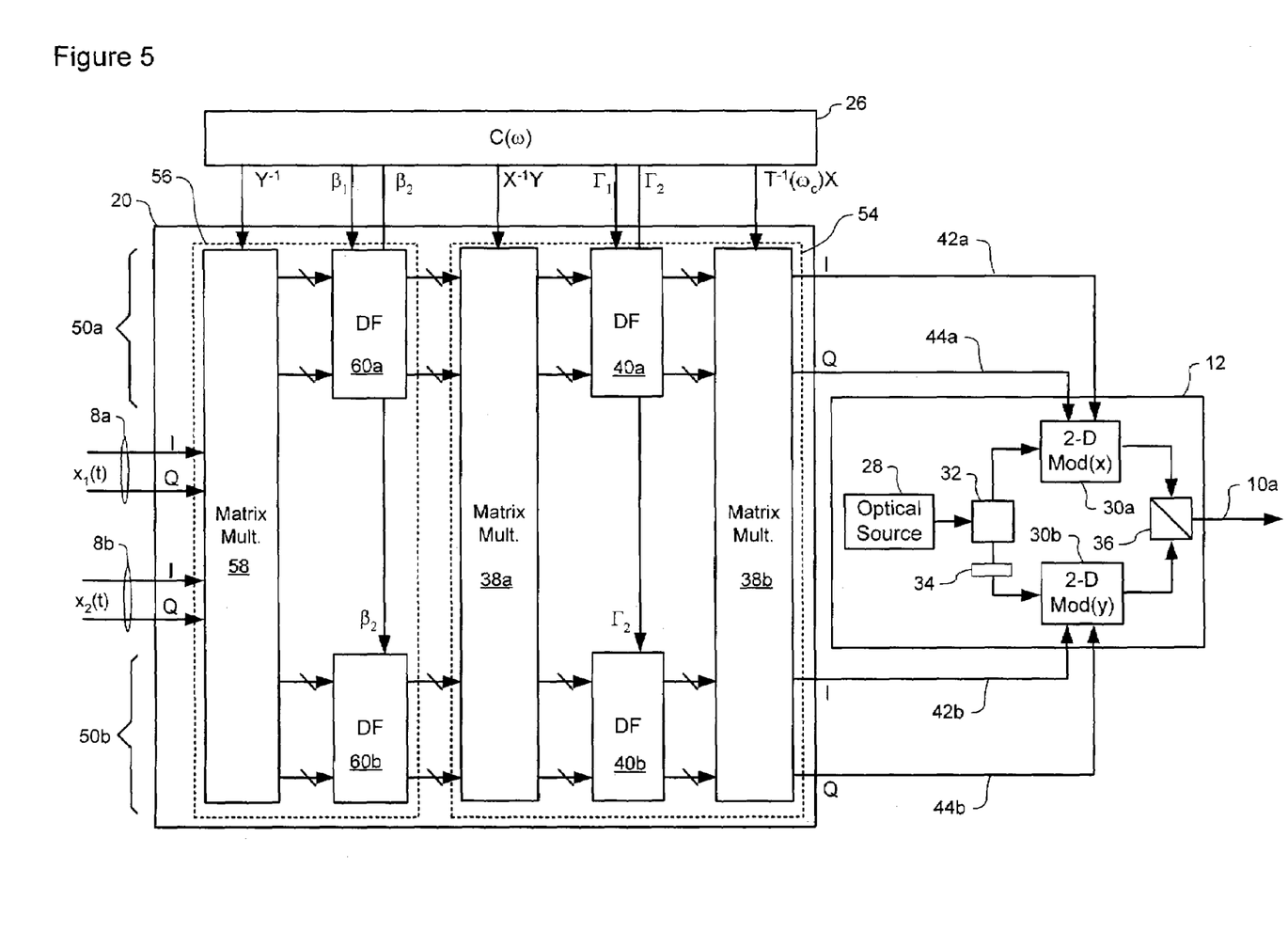
FIG. 5 is a block diagram schematically illustrating principle elements and operations of a PDE compensation system for compensating both first and second order PDE in a Polarization multiplex optical communications system, in accordance with the present invention.

FIGS. 3a and 3b are block diagrams schematically illustrating principal elements and operations of a compensation processor 18 for compensating first order PMD. In the embodiment of FIG. 3*a*, the E/O converter 12 is arranged to launch the predistorted optical signal $E^1_{IN}(\omega)$ 10*a* with an arbitrary polarization relative to the principle states of polarization of the optical link 4. In this case, the compensation function $C(\omega)$ of Eq.4 above reduces to:

$$C(\omega) = T^{-1}(\omega_c)X \begin{bmatrix} \exp(j\Gamma_1\delta\omega) & 0 \\ 0 & \exp(j\Gamma_2\delta\omega) \end{bmatrix} X^{-1} \quad \text{(Eq. 5)}$$

and can be implemented within the compensation processor 20 by a pair of matrix multiplier circuits 38 separated by a parallel pair of digital filters 40. Derivation of the compensation function $C(\omega)$ (at 26) can be accomplished by finding appropriate values for $T^{-1}(\omega_c)X$, $X^{-1}$, $\Gamma_1$ and $\Gamma_2$. In general, the design of the compensation processor 20 will be driven by the formulation of the compensation function $C(\omega)$ and the requirement that the predistorted signal $x^1(t)$ 22 must be formatted to provide suitable control signals for the E/O converter 12. In the embodiment of FIGS. 3-5, each 2-D modulator 30 is controlled by a respective pair of orthogonal signal components I and Q (at 42 and 44) of the predistorted signal $x^1(t)$ 22. Consequently, quadrature signal components I and Q (at 46 and 48) of the input signal 8 are divided into a pair of compensation paths 50, each of which is associated with a respective 2-D modulator 30. The first matrix multiplier circuit 38*a* operates to multiply the divided I and Q signal components by the matrix $X^{-1}$. The multiplication result within each compensation path 50 is then supplied to a respective digital filter 40, which filters the signal components in accordance with one of the delay terms $\Gamma_1$ and $\Gamma_2$. Various known digital filter types may be used to implement the digital filters 40, such as, for example, Finite Impulse Response (FIR) filters, Infinite Impulse Response (IIR) filters, and Fast Fourier Transform (FFT filters. Finally, the filtered signal components are then multiplied, by the second matrix multiplier circuit 38*b*, in accordance with the matrix $T^{-1}(\omega_c)X$.

The output signals I and Q (at 42 and 44) generated by the matrix multiplier circuit 38*b* of each compensation path 50 represent orthogonal (Cartesian) components of the predistorted signal $x^1(t)$ 22, and thus provide phase and amplitude information for controlling the associated 2-D modulator 30. Because the digital filters 40 of each compensation path 50 operate independently, the respective output signals I and Q generated by each compensation path 50 can contain different phase and amplitude information. This enables a different polarization state to be impressed on each of the orthogonal $HE_{11}$ modes, which are combined by combiner 36 to produce a predistorted optical signal $E^1_{IN}(\omega)$ 10*a* having a polarization state that compensates first order PMD of the link 4. It should be noted that compensation of first-order PMD and PDL, together, can be accomplished using exactly the same structure as shown in FIG. 3*a*. In this case, however, the parameters $\Gamma_1$ and $\Gamma_2$ will be complex to account for the differential loss/gain of the channel.

As may be appreciated, the compensation processor 20 can be implemented to generate signal components of the predistorted signal $x^1(t)$ 22 in any desired format, such as, for example, polar coordinates. The only limitation here is that a suitable 2-D modulator 30 must be provided for modulating the appropriate optical components in response to the signals generated by the compensation processor 20.

FIG. 3*b* is block diagram schematically illustrating principal elements and operations of a first order PMD compensation processor 20, in which the predistorted optical signal $E^1_{IN}(\omega)$ 10*a* is launched with a single polarization that is aligned with a principal state of polarization of the optical link 4. In this case:

$$E_{IN}(\omega) = \begin{pmatrix} E_{IN(X)}(\omega) \\ 0 \end{pmatrix} \quad \text{(Eq. 6)}$$

and the compensation function $C(\omega)$ of Eq.5 above reduces to:

$$C(\omega) = X \quad \text{(Eq.7)}$$

where now $$T(\omega) = T(\omega_c) \cdot \exp(D\delta\omega)$$

This compensation function $C(\omega)$ can be implemented within the compensation processor 20 by a single matrix multiplier circuit 38. Note that, because the predistorted optical signal $E^1_{IN}(\omega)$ 10*a* is aligned with a principal state of polarization of the optical link 4, it is not necessary to compensate for the delays $\Gamma_1$ and $\Gamma_2$ (or the relative delay $\Gamma_1-\Gamma_2$), and the second matrix multiplier 38*b* of FIG. 3*a* can also be omitted. Derivation of the compensation function $C(\omega)$ (at 26) can be accomplished by finding an appropriate value for X. With this arrangement, the received optical signal $E^1_{OUT}(\omega)$ 14*a* will be a delayed and rotated version of the original (undistorted) optical signal $E_{IN}(\omega)$ 10 (FIG. 1), and will be received without distortion due to first order PMD.

FIG. 4 is a block diagram schematically illustrating principal elements and operations of a compensation processor 20 for compensating both first and second order PMD. In this case, the compensation function $C(\omega)$ conforms to Eq.4 above, and derivation of the compensation function $C(\omega)$ (at 26) can be accomplished by finding appropriate values for $T^{-1}(\omega_c)X$, $X^{-1}Y$, $Y^{-1}$, $\beta_1$, $\beta_2$, $\Gamma_1$ and $\Gamma_2$.

The derived compensation function $C(\omega)$ is implemented within the compensation processor 20 by cascading first, and second order compensation blocks 54 and 56. As shown in FIG. 4, the first order compensation block 54 is substantially identical to that of FIG. 3*a*, while the second order compensation block 56 comprises a matrix multiplier 58 cascaded with a parallel pair of digital filters 60. As in the embodiment of FIG. 3*a*, quadrature signal components I and Q of the input signal x(t) 8 are divided into a pair of compensation paths 50, each of which is associated with a respective 2-D modulator 30 of the O/E converter 12. The matrix multiplier 58 of the second order PMD compensation block 56 operates to multiply the I and Q signal components by the matrix $Y^{-1}$. The multiplication result within each compensation path 50 is then supplied to a respective digital filter 60, which filters the signal components in accordance with the second order matrix term:

$$\begin{bmatrix} \exp(j\beta_1\delta\omega^2) & 0 \\ 0 & \exp(j\beta_2\delta\omega^2) \end{bmatrix}$$

Various known digital filter types may be used to implement the digital filters 60, such as, for example, Finite Impulse Response (FIR) filters, Infinite Impulse Response (IIR) filters, and Fast Fourier Transform (FFT) filters.

The output signals generated by the digital filters 60 of each compensation path 50 are then multiplied by the matrix $X^{-1}Y$, using the matrix multiplier 38*a* of the first order compensation block 54. The multiplication result generated by the matrix multiplier 38*a* within each compensation path 50 is then supplied to a respective digital filter 40, which filters the signal components in accordance with the first order delay:

$$\begin{bmatrix} \exp(j\Gamma_1\delta\omega) & 0 \\ 0 & \exp(j\Gamma_2\delta\omega) \end{bmatrix}$$

Finally, the filtered signal components are then multipled, by the third matrix multiplier 38*b*, in accordance with $T^{-1}(\omega_c)$ X.

As in the embodiment of FIGS. 3*a* and 3*b*, the output signals I and Q (at 42 and 44) of each compensation path 50 represent orthogonal (Cartesian) components of the predistorted signal $x^1(t)$ 22, and thus provide phase and amplitude information for controlling the associated 2-D modulator 30. The primary difference between the embodiments of FIGS. 3*a* and 4 is that the addition of the second order compensation block 56 enables the compensation function $C(\omega)$ to be defined to more closely compensate distortions introduced by the transfer function $T(\omega)$. If desired, the compensation function $C(\omega)$ may be derived to include terms for third order through to nth order PDEs, each order of compensation can then be implemented in the compensation processor 20 by means of a respective compensation block that is closely similar to the second order compensation block 56, including respective complex multiplier 58 and digital filters 60.

In the foregoing discussion, the compensation function $C(\omega)$ is derived to compensate signal distortions imposed on optical signals traversing the optical link 4 due to PDEs of the link 4. In general, this functionality can be obtained independently of the modulation scheme used to encode the bit stream into the optical signal. The compensation function $C(\omega)$ operates on the input signal x(t) 8 in the electrical domain to define a desired polarization state of the predistorted optical signal $E^1_{IN}(\omega)$ 10*a* launched into the link 4 by the E/O converter 12. As will be appreciated, virtually any arbitrary polarization state may be obtained in the manner, by suitable selection of the parameter values of the compensation function $C(\omega)$. As such, it is possible to use the compensation function $C(\omega)$ to implement polarization manipulations beyond those required for PDE compensation. For example, the embodiment of FIG. 4, which implements the compensation function $C(\omega)$ of Eq.4, can be modified to produce polarization modulation of the input signal x(t) 8. A further modification of the embodiment of FIG. 4 can be used to implement polarization interleaving of a pair of parallel input signals $x_1(t)$ 8*a* and $x_2(t)$ 8*b*, as shown in FIG. 5.

In the foregoing discussion, the compensation function $C(\omega)$ is derived to compensate PDEs imposed on optical signals traversing the optical link 4. Thus:

$$E_{OUT}^1(\omega)=T(\omega)E_{IN}^1(\omega)\cong E_{IN}(\omega) \tag{Eq.8}$$

As is well known in the art, non-linearities in the E/O and O/E converters 12 and 18, and chromatic dispersion in the optical link 4 will normally cause signal distortions additional to those of PDEs. These signal distortions can conveniently be represented by a scalar transfer function $H(\omega)$, so that Eq.8 takes the form:

$$E_{OUT}^1(\omega)=H(\omega)\cdot T(\omega)\cdot E_{IN}^1(\omega)\cong E_{IN}(\omega) \tag{Eq.9}$$

The scalar transfer function $H(\omega)$ can be compensated independently of the PDE compensation described above with reference to FIGS. 2-5, for example by inserting a digital filter (not shown) upstream of the compensation processor 20.

The embodiments of the invention described above are intended to be exemplary only. The scope of the invention is therefore intended to be limited solely by the scope of the appended claims.

We claim:

1. A method of mitigating polarization dependent effects (PDEs) of an optical link of an optical communications system, the method comprising steps of:
   deriving a compensation function that defines a desired polarization state which at least partially compensates the PDEs of the optical link;
   digitally processing an electrical input signal to be conveyed though the optical communications system, using the compensation function, to generate a predistorted signal; and
   supplying the predistorted signal to an electrical-to-optical (E/O) converter for converting the predistorted signal into a corresponding predistorted optical signal having the desired polarization state, for transmission through the optical link;
   wherein the E/O converter is responsive to the predistorted signal to impress at least amplitude information of the electrical input signal, and differential polarization rotations and delays, onto an input optical signal.

2. A method as claimed in claim 1, wherein the polarization dependent effects (PDEs) comprise any one or more of:
   Polarization Mode Dispersion (PMD); and
   Polarization Dependent Loss (PDL).

3. A method as claimed in claim 2, wherein the step of deriving a compensation function comprises steps of:
   measuring a performance parameter related to the PDEs; and
   calculating respective values of one or more parameters of the compensation function that optimizes the measured performance parameter.

4. A method as claimed in claim 3, wherein the step of measuring the performance parameter comprises a step of measuring any one or more of:
   net PMD at one or more wavelengths;
   net PDL at one or more wavelengths;
   a bit error rate;
   a signal-to-noise ratio;
   a variance of the signal dispersion; and
   an eye-opening ratio.

5. A method as claimed in claim 3, wherein the step of measuring the performance parameter comprises a step of sampling at least one of:
   an optical signal received through the optical communications system; and
   an electrical signal generated by an Optical-to-Electrical (O/E) converter, corresponding to the optical signal received through the optical communications system.

6. A method as claimed in claim 5, further comprising a step of calculating an error function indicative of a difference between the sampling result and a predetermined reference.

7. A method as claimed in claim 1, wherein the step of processing the electrical input signal comprises steps of:

multiplying components of the electrical input signal by a predetermined matrix of the compensation function; and filtering the multiplication result.

8. A method as claimed in claim 7, wherein the compensation function comprises respective terms for first order through to nth order PDEs, where n>1, and wherein the steps of multiplying components of the electrical input signal, and filtering the multiplication result are repeated for each term of the compensation function.

9. A method as claimed in claim 7, wherein the step of filtering the multiplication result comprises a step of digitally filtering each component of the multiplication result using any one of:
a Fast Fourier Transform (FFT) filter;
a Finite Impulse Response (FIR) filter; and
an Infinite Impulse Response (IIR) filter.

10. A polarization compensator for mitigating polarization dependent effects (PDEs) of an optical link of an optical communications system, the polarization compensator being implemented at a transmitter end of the optical link and comprising:
a compensation processor for digitally processing an electrical input signal to be conveyed through the optical communications system, using a predetermined compensation function, to generate a predistorted electrical signal, wherein the compensation function defines a desired polarization state which at least partially compensates the PDEs of the optical link; and
an electrical-to-optical (E/O) converter for converting the predistorted electrical signal into a corresponding predistorted optical signal, having the desired polarization state, for transmission though the optical links;
wherein the E/O converter is responsive to the predistorted signal to impress at least amplitude information of the electrical input signal, and differential polarization rotations and delays, onto an input optical signal.

11. A polarization compensator as claimed in claim 10, wherein the compensation processor comprises at least one matrix-multiplier adapted to multiply components of the electrical input signal by a matrix of the compensation function.

12. A polarization compensator as claimed in claim 11, wherein the compensation processor further comprises a digital filter adapted to filter the multiplication result.

13. A polarization compensator as claimed in claim 12, wherein two or more orders of PDE are mitigated by cascading successive PDE compensation blocks, each compensation block being adapted to mitigate a single order of PDE and comprising at least one respective matrix multiplier and a digital filter.

14. A polarization compensator as claimed in claim 12, wherein the digital filter comprises any one of:
a Fast Fourier Transform (FFT) filter;
a Finite Impulse Response (FIR) filter; and
a Infinite Impulse Response (IIR) filter.

15. A system as claimed in claim 10, wherein the compensation processor comprises:
at least one matrix-multiplier for multiplying components of the electrical input signal by a matrix of the compensation function; and
a digital filter for filtering the multiplication result.

16. A system as claimed in claim 15, further comprising two or more cascaded PDE compensation blocks, each compensation block being adapted to mitigate a corresponding single order of PDE and comprising at least one respective matrix multiplier and a digital filter.

17. A system as claimed in claim 15, wherein the digital filter comprises any one of:
a Fast Fourier Transform (FFT) filter;
a Finite Impulse Response (FIR) filter; and
a Infinite Impulse Response (IIR) filter.

18. An optical communications system for conveying a bit stream though an optical link between a transmitter and a receiver, the system comprising:
a first processor for deriving a compensation function that defines a desired polarization state which at least partially compensates polarization dependent effects (PDEs) of the optical link;
a compensation processor for digitally processing an electrical input signal to be conveyed through the optical communications system, using the compensation function, to generate a predistorted signal; and
an electrical-to-optical E/C converter for modulating an input optical signal using the predistorted signal to generate a corresponding predistorted optical signal, having the desired polarization state, for transmission through the optical link;
wherein the E/O converter is responsive to the predistorted signal to impress at least amplitude information of the electrical input signal, and differential polarization rotations and delays, onto an input optical signal.

19. A system as claimed in claim 18, wherein the first processor is implemented remote from the compensation processor.

20. A system as claimed in claim 18, wherein the polarization dependent effects (PDEs) comprise any one or more of:
Polarization mode dispersion (PMD); and
Polarization Dependent Loss (PDL).

21. A system as claimed in claim 20, wherein the first processor comprises:
a detector for measuring a performance parameter related to PDE; and
a calculation engine for calculating respective values of one or more parameters of the compensation function that optimizes the measured performance parameter.

22. A system as claimed in claim 21, wherein the detector is adapted to measure any one or more of:
net PDL at one or more wavelengths;
net PMD at one or more wavelengths;
a bit error rate;
a signal-to-noise ratio;
a variance of the signal dispersion; and
an eye-opening ratio.

23. A system as claimed in claim 21, wherein the detector is adapted to sample at least one of:
an optical signal received through the optical communications system; and
an electrical signal generated by an Optical-to-Electrical (O/E) converter, corresponding to the optical signal received through the optical communications system.

24. A system as claimed in claim 23, wherein the calculation engine is further adapted to calculate an error function indicative of a difference between the sampling result and a predetermined reference.

25. A method of conveying a bit stream through an optical link between a transmitter and a receiver, the method comprising steps of:
deriving a compensation function that defines a desired polarization state which at least partially compensates Polarization Dependent Effects (PDEs) of the optical link;

processing the bit stream using the compensation function to generate a predistorted signal; and modulating an input optical signal using the predistorted signal to generate a corresponding predistorted optical signal, having the desired polarization state, for transmission through the optical link.

26. A method as claimed in claim 25, wherein the polarization dependent effects (PDEs) comprise any one or more of:

Polarization Mode Dispersion (PMD); and
Polarization Dependent Loss (PDL).

27. A method as claimed in claim 26, wherein the step of deriving a compensation function comprises steps of:

measuring a performance parameter related to the PDEs; and calculating respective values of one or more parameters of the compensation function that optimizes the measured performance parameter.

28. A method as claimed in claim 27, wherein the step of measuring the performance parameter comprises a step of measuring any one or more of:

net PMD at one or more wavelengths;
net PDL at one or more wavelengths;
a bit error rate;
a signal-to-noise ratio;
a variance of the signal dispersion; and
an eye-opening ratio.

29. A method as claimed in claim 27, wherein the step of measuring the performance parameter comprises a step of sampling at least one of:

an optical signal received through the optical communications system; and an electrical signal generated by an Optical-to-Electrical (O/E) converter, corresponding to the optical signal received through the optical communications system.

30. A method as claimed in claim 29, further comprising a step of calculating an error function indicative of a difference between the sampling result and a predetermined reference.

31. A method as claimed in claim 25, wherein the step of processing the bit stream comprises steps of:

multiplying components of the bit stream by a matrix of the compensation function; and filtering the multiplication result.

32. A method as claimed in claim 31, wherein the compensation function comprises respective terms for first order through to nth order PDEs, where n>1, and wherein the steps of multiplying components of the bit stream, and filtering the multiplication result are repeated for each term of the compensation function.

33. A method as claimed in claim 31, wherein the step of filtering the multiplication result comprises a step of digitally filtering each component of the multiplication result using any one of:

a Fast Fourier Transform (FFT) filter;
a Finite Impulse Response (FIR) filter; and
an Infinite Impulse Response (IIR) filter.

* * * * *